United States Patent [19]

Oechsle

[11] Patent Number: 5,014,504

[45] Date of Patent: May 14, 1991

[54] LAWN COMBER ATTACHMENT

[76] Inventor: Walter Oechsle, 2 Halcyon Drive, Glen Waverley, Victoria, Australia, 3150

[21] Appl. No.: 461,050

[22] Filed: Jan. 4, 1990

[51] Int. Cl.⁵ .......................................... A01D 57/12
[52] U.S. Cl. ...................................................... 56/372
[58] Field of Search ................... 56/370–372, 56/365, 367; 267/166.1, 179, 180, 173

[56] References Cited

U.S. PATENT DOCUMENTS

| | | | |
|---|---|---|---|
| 2,811,008 | 10/1957 | Plant | 56/367 |
| 3,132,460 | 5/1964 | Spindler | 56/372 |
| 3,173,238 | 3/1965 | Smith | 56/372 |
| 3,478,500 | 11/1969 | Rhoads | 56/372 |

Primary Examiner—Thuy M. Bui
Attorney, Agent, or Firm—Foley & Lardner

[57] ABSTRACT

A lawn comber or thatcher comprising a drum carrying a multiplicity of rows of radially extending tines extending from the surface of the drum, each row extending in a generally angular or helical path along the drum and being spaced such that at least one tine is always in contact with the ground to provide a driving force for the thatcher, each tine having a torsion or helical spring portion at a position adjacent the inner most end of each tine.

15 Claims, 3 Drawing Sheets

LAWN COMBER ATTACHMENT

FIELD OF THE INVENTION

This invention relates to lawn combers, thatchers, power rakes and other implements for removing materials from a lawn or from the ground.

BACKGROUND OF THE INVENTION

Lawn combers or so-called thatchers are available in a number of different forms. For Example, Blue Bird International of Colorado United States of America manufacture a range of lawn combers or power rakes in which a multiplicity of flails are rotated by a motor to remove to thatch embedded in heavy turf. Such lawn combers are quite complex in constructions and their cost is prohibitive to most gardeners. Similarly, a large size thatcher is available under the brand name Dixon but is once again expensive and requires an additional prime mover.

SUMMARY OF THE INVENTION AND OBJECT

It is an object of the present invention to provide a low speed lawn comber, thatcher or power rake of simple yet effective construction. A secondary object of the invention is to provide an attachment for an existing driven implement which converts that implement into a compact comber or power rake in a simple and inexpensive manner.

In one form, the invention provides an implement for removing material lying on the ground comprising a drum supported for rotation in a generally horizontal orientation, said drum carrying a multiplicity of rows of radially extending tines extending from the surface of the drum, each row extending in a generally angular or helical path along the drum, each row being so spaced from its adjacent row that at least one of said tines is substantially always in contact with the ground in use whereby the tines act as a driving mechanism for the implement each tine being formed such that it is resiliently flexible intermediate its ends.

In another form, the invention provides an attachment for an existing driven implement comprising a drum having a multiplicity of rows of radially extending tines extending from the surface of the drum, each row extending in a generally angular or helical path along the drum, each row being so spaced from its adjacent row such that in use one of said tines is substantially always in contact with the ground in use whereby the tines act as a driving mechanism for the implement, each time being formed such that it is resiliently flexible intermediate its ends.

Each drum preferably includes at least one, and preferably two axially spaced, centre alignment bracket(s) adapted to receive a supporting shaft for securing one or more drums to a driving mechanism. In one presently preferred form of the invention, the drums are adapted for securement to a cultivating machine, such as a Masport "Home Gardener", in a manner described in greater detail below. Alternatively, the drums may be modified for attachment to any other form of driven implement capable of supporting such an attachment.

A guard is desirably fitted to the implement to protect the user and the driver mechanism against the removed thatch material and other debris which is flicked by the spring tines, and to prevent entanglement during use between the tines and shrubs or low overhanging branches.

It will be appreciated from the above that the attachment described is not only simple and inexpensive in construction but also operates to transport the implement to which it is attached over the lawn or other surface being treated. Since the tines are resiliently flexible intermediate their ends, the likelihood of the tines damaging the lawn is reduced and their flexibility ensures that the tines are not damaged by engaging foreign matter in the lawn, and the implement driving the attachment proceeds more smoothly over the surface being treated. Furthermore, the "flicking" action of the tines ensures that the thatch is removed from the tines, so the tines are effectively self-cleaning.

Since the attachments maybe secured to an existing implement, the cost to the user is significantly reduced thereby enabling any home gardener to perform lawn combing or thatching, even if a tilling machine has to be purchased. The advantage of such an arrangement is that the driven implement is also usable for its primary purpose and accordingly an expensive single purpose machine does not need to be purchased.

BRIEF DESCRIPTION OF THE DRAWINGS

One presently preferred embodiment of the invention will now be described with reference to the accompanying drawings in which.

DESCRIPTION OF PREFERRED EMBODIMENT

Figure 1:
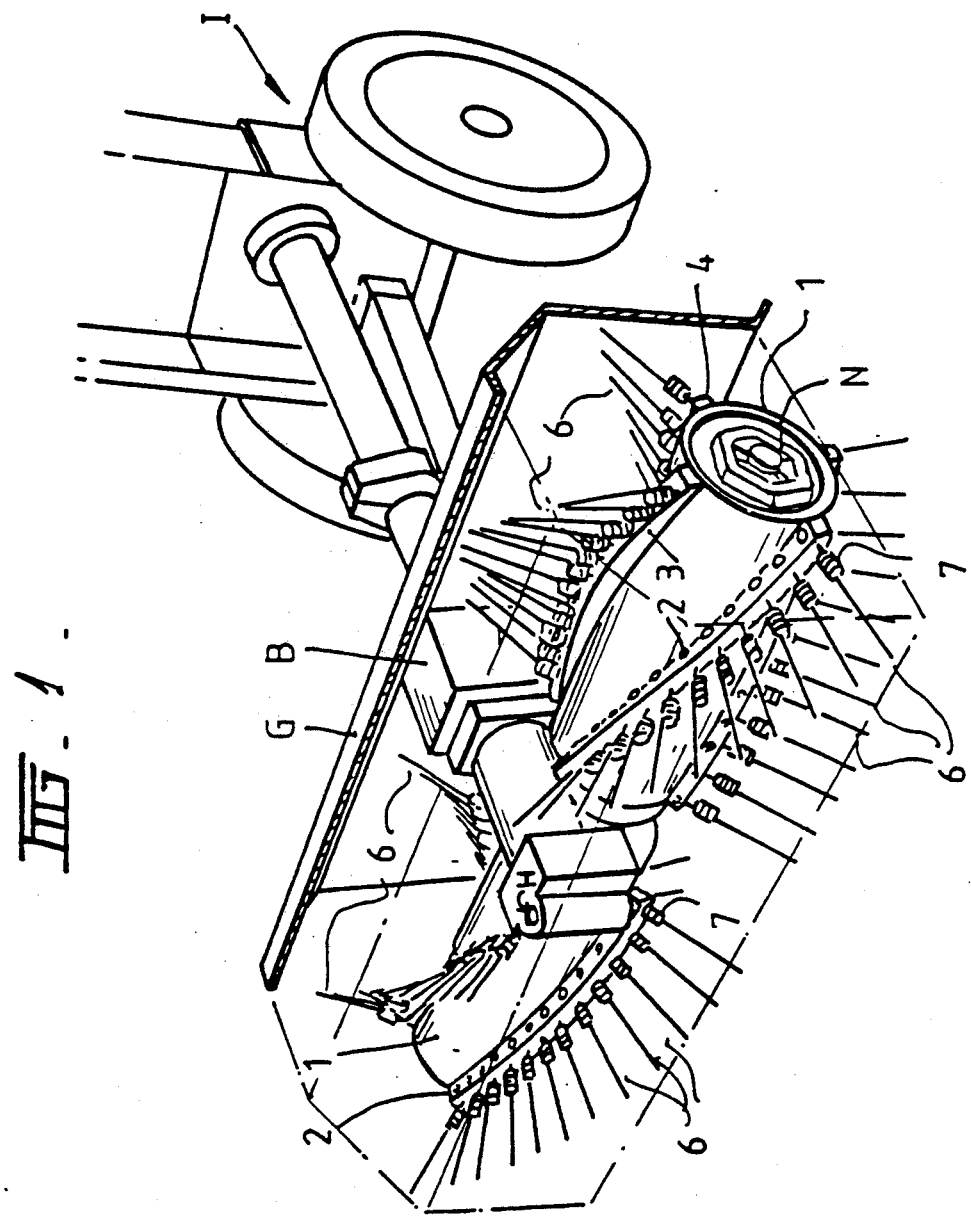
FIG. 1 is a perspective view of a lawn comber attachment embodying the invention fitted to a power driven implement thereto.

As shown in the drawings, the lawn combing/power rake attachment embodying the invention comprises a pair of drums 1 to each of which four supporting bars 2, 3, 4 and 5, each supporting a multiplicity of radially extending tines 6, are secured, such as by welding, each bar 2, 3, 4 and 5 extending along the length of each drum 1 in a generally helical path. The supporting bars 2 to 5, and thus the rows of tines supported thereby, are spaced from each other so that the end of each row at one end of the drum is at least tangential to the end of the adjacent row at the opposite end of the drum. As will be noted from FIG. 4 of the drawings, each tine 6 is formed with a coiled spring portion 7 adjacent one end which is received in bores 8 formed in the supporting bars 2 to 5 and is secured in position by means of a clamping grub screw 8a. Since the screw 8a slightly bends the end of each tine 6 into a counterbore recess 8b opposite each screw 8a, the tines 6 are securely attached to their drums notwithstanding the forces applied thereto by the tines engaging the ground. The tines 6 are formed from galvanised or stainless steel spring wire to provide the necessary resilience in each wire via the spring portions 7.

Figure 4A:
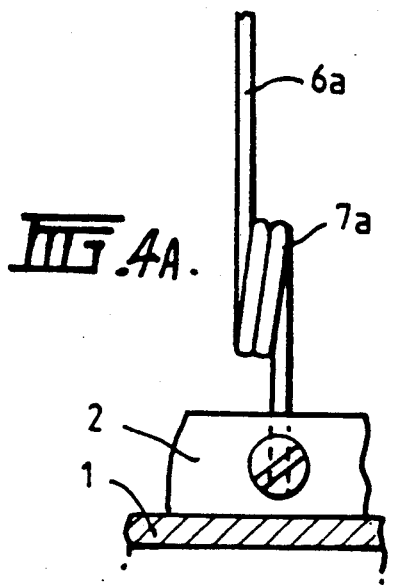
FIG. 4A is a similar elevation of a modified tine having a torsion spring portion therein.
Figure 4:
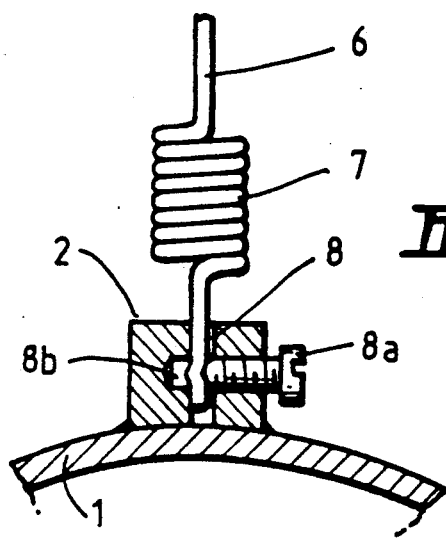
FIG. 4 is an enlarged fragmentary sectional elevation of one tine of the attachment.

As shown in FIG. 4A, the tines 6a may be formed with a torsion spring loop 7a to reduce the cost of manufacture of each tine.

Figure 3:
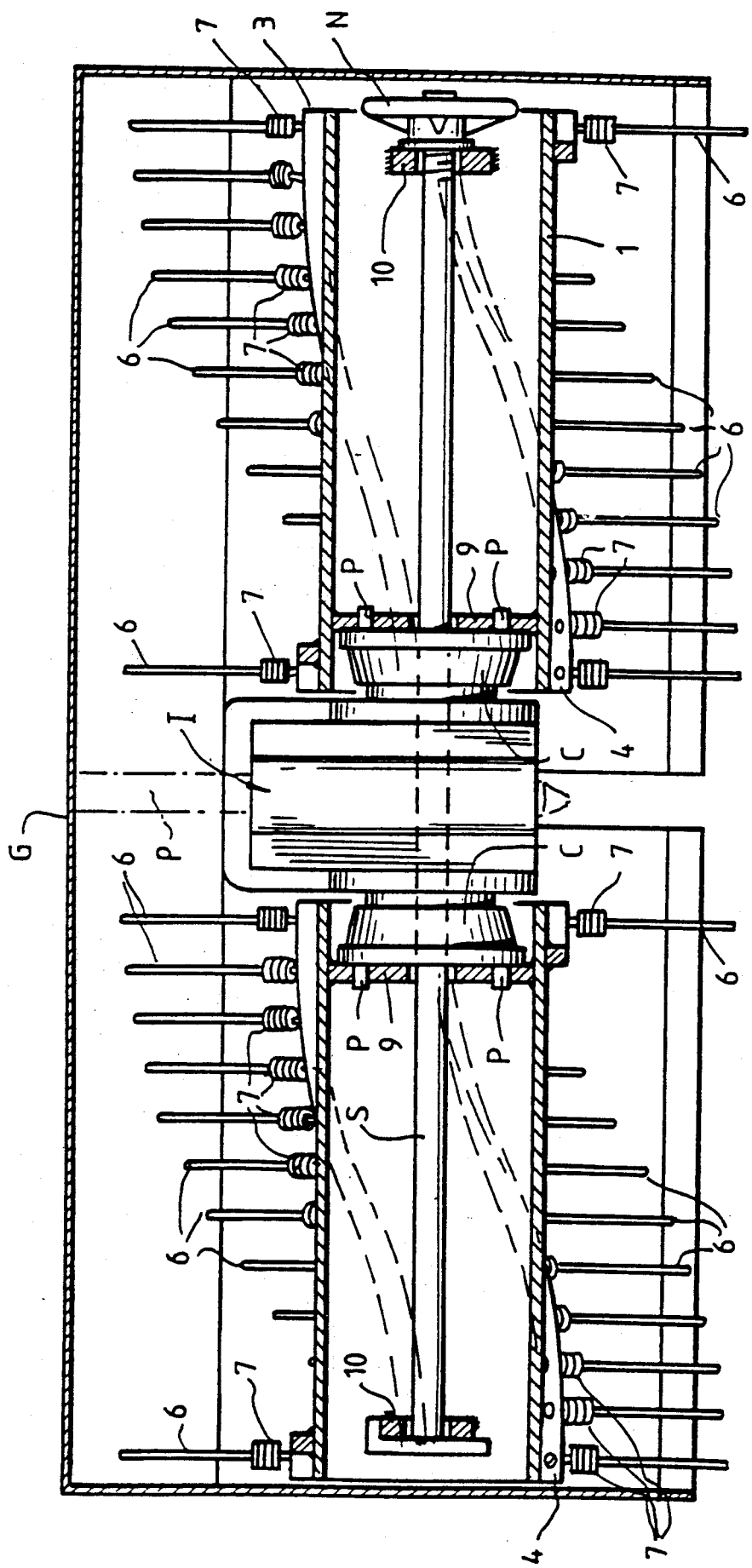
FIG. 3 is a sectional front view of the attachment.

Each drum 1 has a pair of spaced centre-alignment brackets 9 and 10 secured inside the drum 1, each bracket having a centre-alignment opening and being positioned to engage a coupling C forming part of the driven implement I, which, in the present embodiment, is a Masport "Home Gardener". As shown most clearly in FIG. 3 of the drawings, a pair of drums 1 is attached to the implement I by means of a bracing shaft S which passes through the centre-alignment brackets 9 and 10 and is secured by means of a hand wheel nut N which is supplied with the implement I. Thus, when the drums 1 are secured to the implement, the pins P formed on the coupling C engage the innermost centre-alignment brackets 9 of each drum 1 and the implement therefore rotates the drums about a generally horizontal axis.

Figure 2:
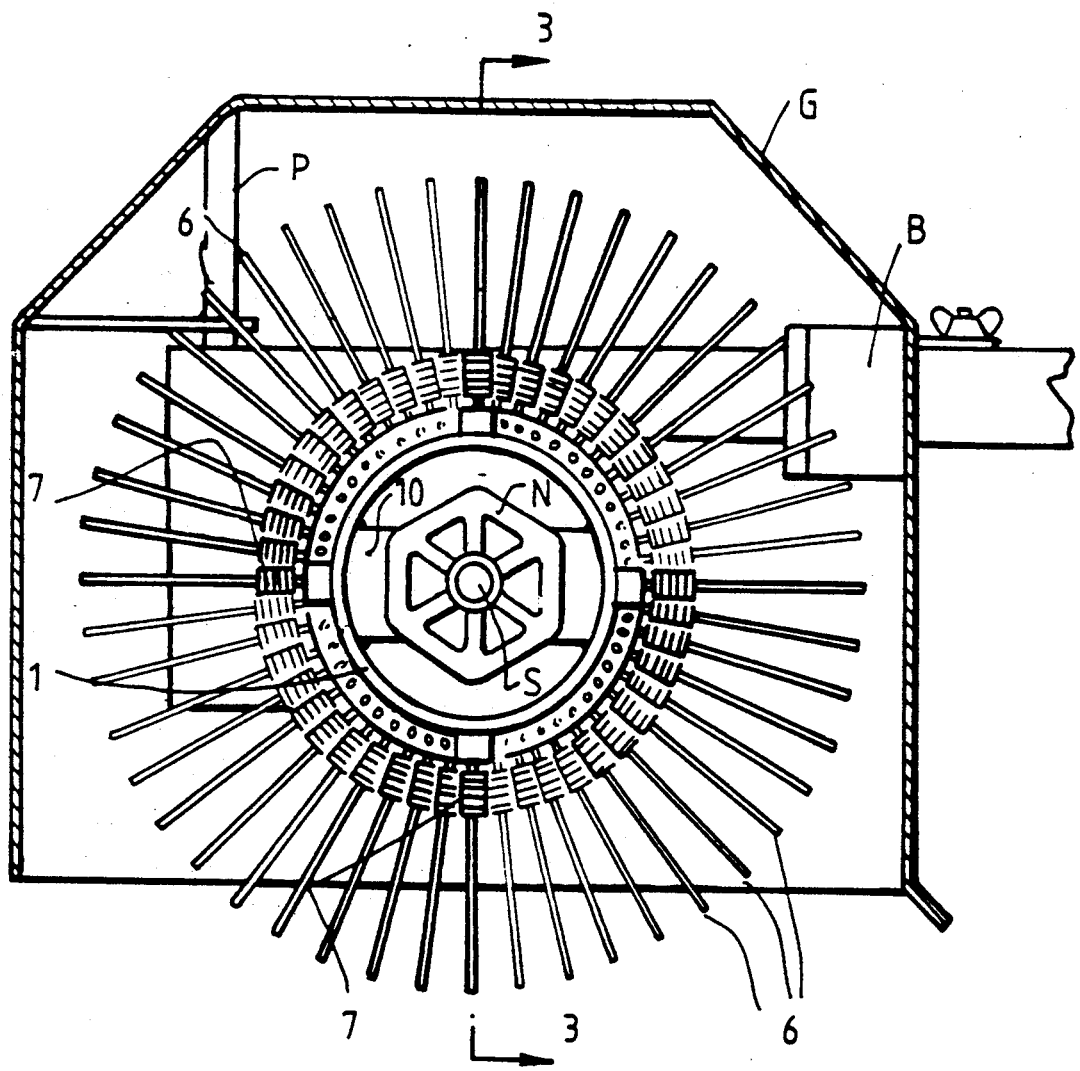
FIG. 2 is an end elevation of the attachment.

To protect the user against flying debris removed by the spring tines 6, and to prevent entanglement between the tines and shrubs and low overhanging branches, a shaped guard G, which surrounds the drums 1 and tines 6 and is open only at the bottom, is attached to the implement I by means of a locating pin P engaging an existing hole H in its drive housing and a clamping bracket B, on the drive shaft housing, the guard G being held in place by a wing nut (FIG. 2).

In use, the tines 6 engage the lawn or other surface to be treated and rotation of the drums by the implement I causes the implement to move across the surface being treated. The intensity of combing is controlled by the relative speed of implement to ensure that the required 'combing' action is achieved. Since the rows the tines 6 are arranged in the manner described above, at least one tine 6 is always in engagement with the ground so that the implement I is moved across the surface to be treated. The provision of spring portions 7 in each tine 6 also ensures that damage to the the tines 6 by foreign matter in the lawn is kept to a minimum and that the tines operate to remove the dead grass or thatch from the lawn in an efficient manner. The tines operate with a "flicking" action which not only removes the dead grass or thatch from the ground but also from the tines, so the tines are effectively self-cleaning.

It will be appreciated from the above that the drum attachments embodying the invention are relatively inexpensive and since they may be fitted to an existing implement, the total cost of the resulting comber/power rake would be within the reach of the average home gardener.

Although the invention has been described in relation to one particular type of implement, it should be appreciated that the attachments embodying the invention may be modified to suit other driven implements. Alternatively, a lawn comber/power rake may be constructed as a single purpose implement of any required dimensions and still be less expensive than the single purpose implements discussed above. Similarly the implement, in any one of its forms, may be associated with a grass catcher of any suitable form, which may be attached to the implement to catch the thatch and dirt removed by the tines.

The claims form part of the disclosure of this specification.

I claim:

1. An implement for removing material lying on the ground comprising a drum supported for rotation in a generally horizontal orientation, said drum carrying a multiplicity of rows of radially extending tines extending from the surface of the drum, each row extending in a generally angular or helical path along the drum, each row being so spaced from its adjacent row that at least one of said tines is substantially always in contact with the ground in use whereby the tines act as a driving mechanism for the implement, each tine being formed such that it is resiliently flexible intermediate its ends.

2. An attachement for an existing driven implement comprising a drum having a multiplicity of rows of radically extending tines extending from the surface of the drum, each row extending in a generally angular or helical path along the drum, each row being so spaced from its adjacent row such that in use one of said tines is substantially always in contact with the ground in use whereby the tines act as a driving mechanism for the implement, each tine being formed such that it is resiliently flexible intermediate its ends.

3. The implement according to claim 1 or 2, wherein each row of tines comprises a supporting bar member formed with a multiplicity of radially extending bores, each dimensioned to receive one end of said tines in said bores in a manner which slightly deforms said one end of said tines to positively retain said tines in said bores in said bar members.

4. The implement according to claim 1, wherein said drum includes at least one centre alignment bracket formed to receive a supporting shaft for securing said drum to a driving mechanism.

5. The implement according to claim 4, wherein said driving mechanism comprises a driven implement having a central power output means to which pairs of coupling means are attached, and a said drum attached at one end to each of said coupling means and held in position by a central shaft held in place by a removable attachment fitting engaging a further centre alignment bracket attached inside each drum at the other ends.

6. An implement according to claim 1, wherein each tine is formed from spring wire and is formed with a torsion or helical spring portion at a position adjacent one end of each tine.

7. An implement according to claim 1, further comprising a guard attached to said implement to protect the user and implement against flying debris and against entanglement with shrubs and low branches.

8. An implement for removing material lying on the ground comprising a support mounted for rotation in a generally horizontal orientation, said support carrying a multiplicity of tines extending therefrom, each tine comprising a length of spring wire formed with a spring loop portion adjacent one end of the tine, said support having a multiplicity of bores, each of which receives said one end of a tine, and a clamping means for engaging one end of said tines in said bores in a manner which deforms said one end to positively retain said tines in said bores.

9. The implement of claim 8, wherein said clamping means comprises a clamping screw engaging a threaded hole which is formed in said support and intersects one of said bores, and a recess opposite each clamping screw to allow said one end of each tine to be laterally deformed by said clamping screw to ensure positive securement of said tines to said support.

10. The attachment according to claim 2, wherein said drum includes at least one centre alignment bracket formed to receive a supporting shaft for securing said drum to a driving mechanism.

11. The attachment according to claim 10, wherein said driving mechanism comprises a driven implement having a central power output means to which pairs of coupling means are attached, and a said drum attached to each of said coupling means and held in position by a central shaft held in place by a removable attachment fitting engaging a further alignment bracket attached inside each drum adjacent their outermost ends.

12. An attachment according to claim 2, wherein each tine is formed from spring wire and is formed with a torsion or helical spring portion at a position adjacent the inner most end of each tine.

13. An attachment according to claim 2, further comprising a guard attached to said implement to protect the user and implement against flying debris and against entanglement with shrubs and low branches.

14. The implement of claim 8 wherein said spring loop portion comprises a torsion spring.

15. The implement of claim 8 wherein said spring loop portion comprises a helical spring.

* * * * *